United States Patent [19]
Daniels

[11] 3,964,355
[45] June 22, 1976

[54] AIR CUSHION SHEET SUPPORT

[75] Inventor: Dennis Daniels, Bellevue, Wash.

[73] Assignee: U.S. Amada, Ltd., City of Industry, Calif.

[22] Filed: Feb. 18, 1975

[21] Appl. No.: 550,438

Related U.S. Application Data

[60] Division of Ser. No. 386,064, Aug. 6, 1973, which is a continuation-in-part of Ser. No. 359,983, May 14, 1973, abandoned.

[52] U.S. Cl. .................................. 83/169; 83/402; 269/20; 408/56
[51] Int. Cl.² .................... B23D 53/04; B23D 59/00
[58] Field of Search ............ 83/402, 451, 168, 169; 269/20; 408/56

[56] References Cited
UNITED STATES PATENTS

| | | | |
|---|---|---|---|
| 3,076,365 | 2/1963 | Taylor et al. | 83/402 X |
| 3,196,910 | 7/1965 | Hawkins | 83/402 X |
| 3,273,775 | 9/1966 | Cook | 83/402 X |
| 3,488,674 | 1/1970 | Simjian | 269/20 X |

*Primary Examiner*—Othell M. Simpson
*Assistant Examiner*—Z. R. Bilinsky
*Attorney, Agent, or Firm*—Seed, Berry, Vernon & Baynham

[57] ABSTRACT

A band saw is provided with rotary guides for changing the angle of the saw. While the part is rotated and linearly translated toward and away from the saw by the contouring apparatus, the saw cuts a peripheral shape on the part with the blade, changing its angular attitude where necessary. An air cushion support holds the edge of the part at the saw blade.

6 Claims, 12 Drawing Figures

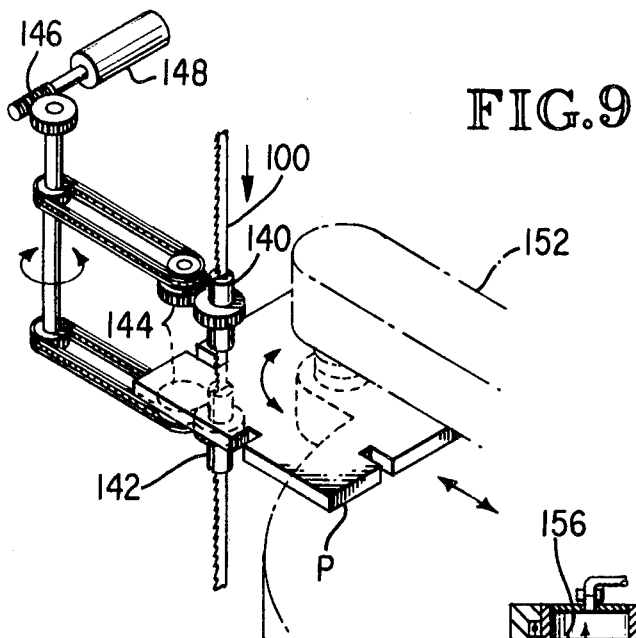
FIG. 9
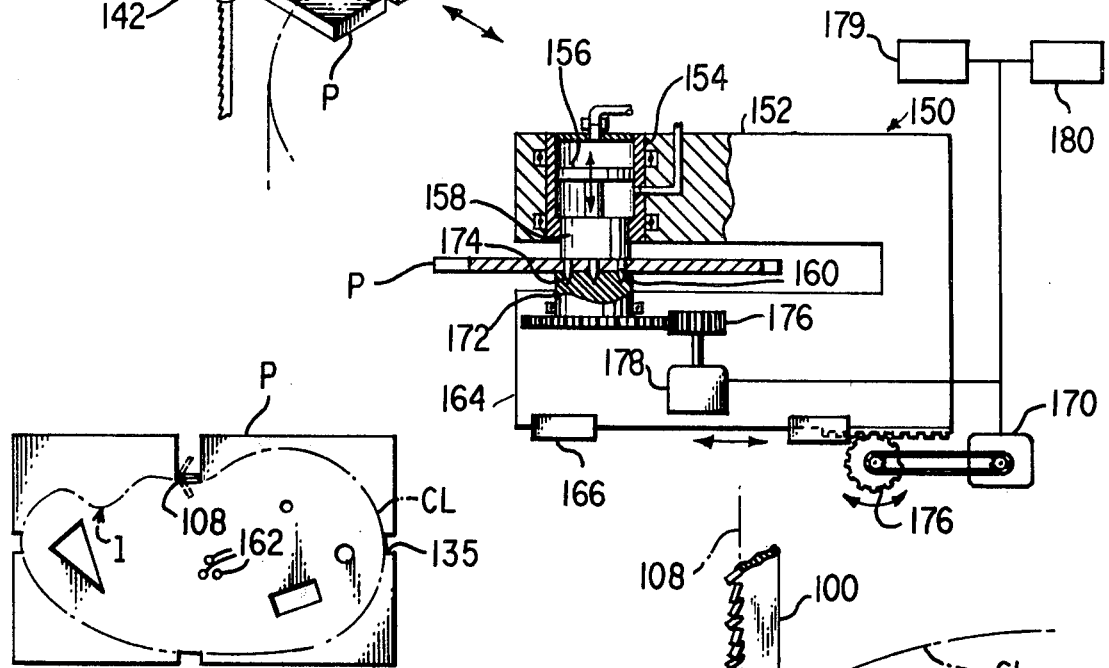
FIG. 10
FIG. 11
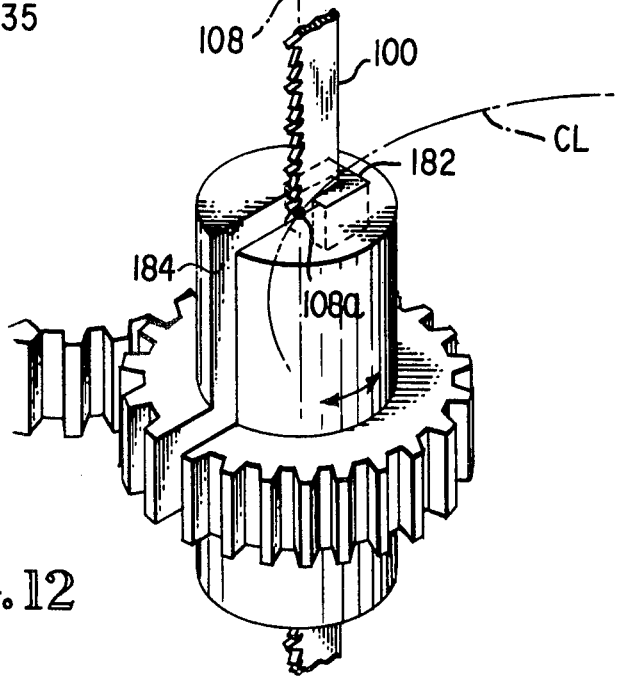
FIG. 12

AIR CUSHION SHEET SUPPORT

CROSS-REFERENCE TO RELATED APPLICATIONS

This is a division of application Ser. No. 386,064, filed Aug. 6, 1973, which is a continuation-in-part of my earlier U.S. Pat. application, Ser. No. 359,983, filed May 14, 1973, now abandoned.

BACKGROUND OF THE INVENTION

1. Field of the Invention

This invention pertains to sheet material handling and fabricating components. The sheet material is of the self-shape-sustaining type, such as plastic, wood or metal.

2. Description of the Prior Art

In many industries, particularly the aerospace industry, there is a need for the mechanized production of a relatively few irregularly shaped sheet material parts. For example, only 2 or 300 such parts may be needed in a year. Presently, these parts are made by first cutting a templet and then, either by hand or with limited machinery, cutting the shape of the templet in the sheet material. After the part is cut, a considerable amount of manual deburring of the cut edge is required, with still more surface finishing following. The cost of such individual parts is quite high and since a particular industry may need as many as 2 or 3 thousand different shaped parts manufactured in this way, the ultimate cost is considerable.

There is, therefore, a need in the sheet material handling and fabricating industry for an apparatus or method to mechanize the production of a large variety of relatively few parts of sheet material. While the numerically controlled punch press is a useful tool for satisfactorily fabricating holes or the like internally in the part, it is not satisfactory for cutting the peripheral shape of such irregularly shaped parts, and thus cannot fully satisfy the need for full mechanization.

One difficulty in cutting a peripheral shape in moving sheet material is that of supporting the sheet in close proximity to the cutting element without increasing the friction between the sheet and the support. Additionally, it is desirable when cutting with a band saw blade, for example, to reduce vibration caused by the blade engagement with the sheet.

SUMMARY OF THE INVENTION

It is an object of this invention to provide an air cushion support for the outer edge of a sheet material part around a cutter.

It is another object to provide a low-friction sheet material part support mechanism for supporting a moving part in close proximity to a cutting tool.

It is another object to provide a sheet material part support mechanism for damping vibration of the part peripheral region caused by cutter imposed forces.

It is another object to provide a low-friction sheet material part support and part vibration damping mechanism surrounding a stationarily positioned cutter.

These objects are best obtained by apparatus to support a moving sheet material part at the stationary cutting station in close proximity to the cutting blade or other surface cutting or finishing tool by an air cushion which allows free frictionless translation of the part for positioning the part relative to the blade and also dampens vibrations of the part during the cutting operation. In the preferred embodiment, the air cushion is provided below and above the part with an additional pneumatic mechanism for lowering and retracting the upper half of the air cushion device to allow insertion of the part and provide control of the air acting on the part. When the cutting tool is an endless band saw blade, the support also balances and continuous unidirectional force imposed by the blade.

BRIEF DESCRIPTION OF THE FIGURES OF THE DRAWING

FIG. 9 is a schematic isometric of a modified form of cutting apparatus usable with the apparatus shown in FIG. 1.

FIG. 10 is a schematic side elevation of a modified form of contouring apparatus.

FIG. 11 is a second example of a typical part that can be made with the apparatus of the preferred embodiment or the modified embodiment shown in FIGS. 9 and 10.

FIG. 12 is a fragmentary schematic of a portion of the apparatus shown in FIG. 9.

DETAILED DESCRIPTION OF THE PREFERRED EMBODIMENT

General Description

Figure 1:
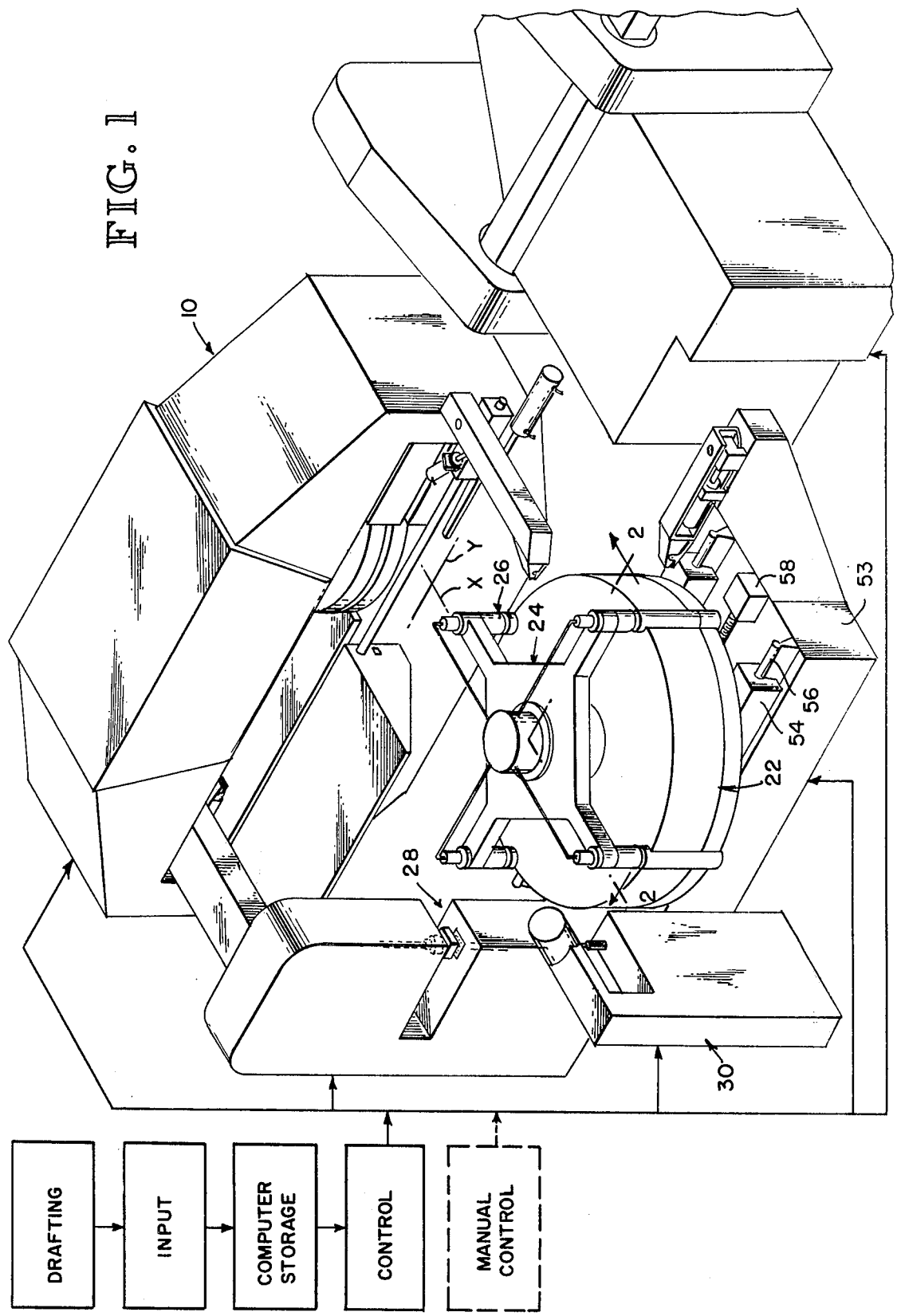
FIG. 1 is an isometric of a punching and contouring apparatus embodying the principles of the invention.

As best illustrated in FIG. 1, the preferred punching and contouring apparatus employing various inventive features includes a rotary turret-type, numerically controlled punch press 10, preferably of the type illustrated in U.S. Pat. No. 3,717,061, the description of which is incorporated herein by reference thereto.

The contouring apparatus 22 is located adjacent the punch press 10 and includes, in general, a rotary turret 24 movable between four stations. The turret includes four arms, each carrying a rotary chuck 26. The turret moves the rotary chuck first to a cutting apparatus 28, thence to a deburring apparatus 30, and finally to a discharge station where the part is removed from the chuck.

Contouring Apparatus

Figure 2:
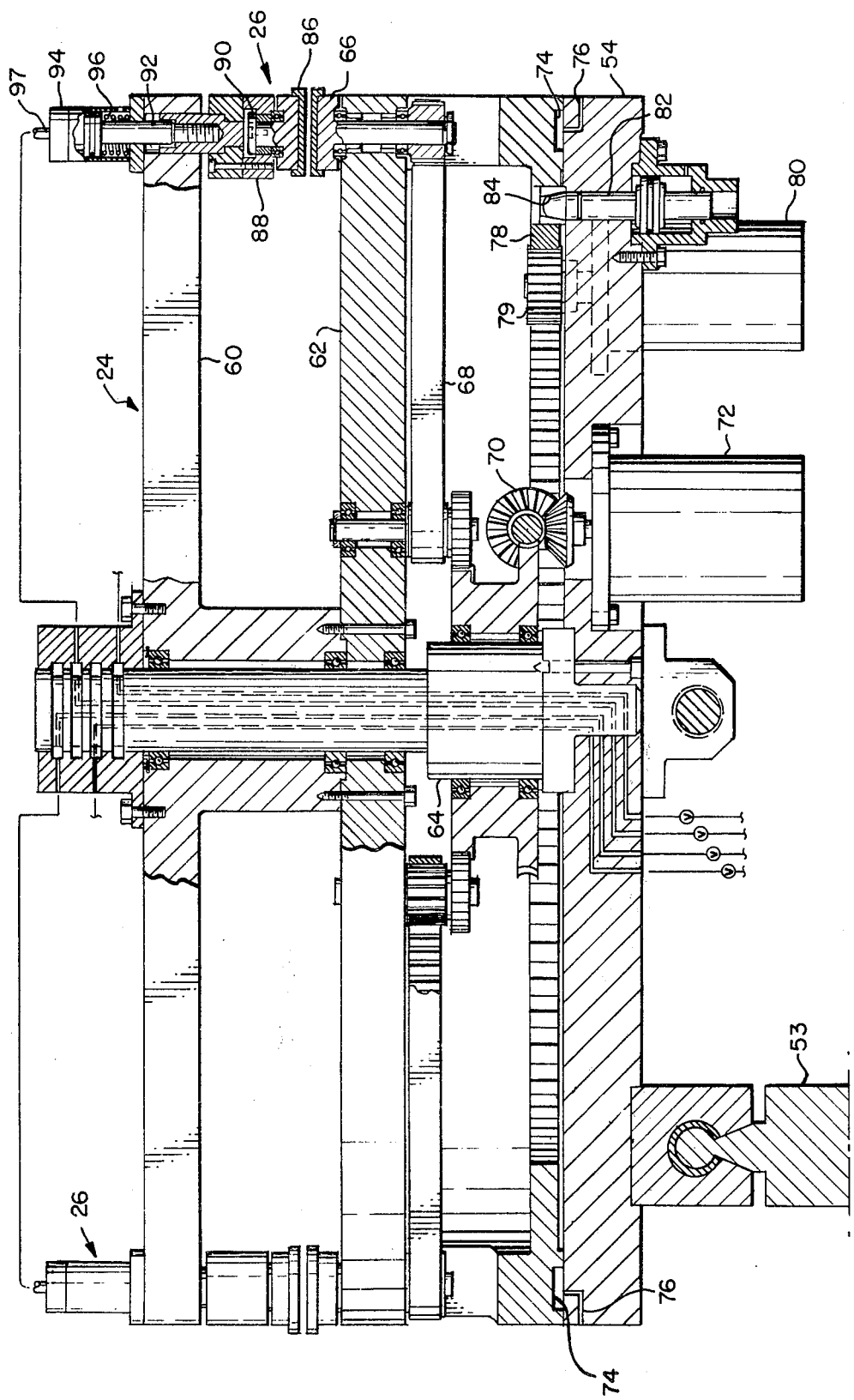
FIG. 2 is a vertical section axially through the contouring apparatus shown in FIG. 1.
Figure 3:
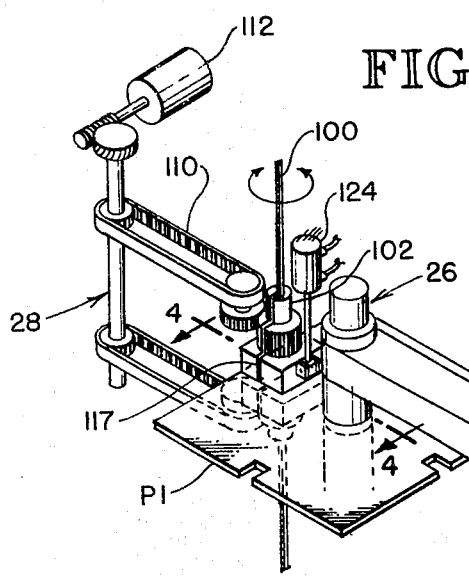
FIG. 3 is a schematic isometric of a portion of the cutting apparatus shown in the apparatus of FIG. 1.

The contouring apparatus 22 is best shown in FIGS. 1, 2 and 10. The apparatus comprises a base 53 on which is mounted a movable carriage 54. The carriage 54 slides on rails 56 in a direction parallel to the Y axis of the punch press. It should be understood at this point that the movable direction of the carriage 54 need not be parallel to the Y axis of the punch press, but rather, can be any direction which avoids interference with operation of the punch press. The carriage is moved by a conventional worm drive powered by a motor 58. The turret 24 is rotatably mounted on the movable carriage 54 and includes a spider or set of upper arms 60 and a disk 62. The arms 60 and disk 62 are rotatably mounted on a fixed hollow shaft 64. Mounted in the disk 62 are four rotatable plates 66 which are connected by belt drives 68 and interconnected gearing 70 to a motor 72. Rotation of the output shaft of the motor 72 will rotate all four plates 66 simultaneously.

The disk 62 is supported on the movable carriage 54 by an air cushion chamber 74 using conventional techniques and which is pressurized through a port 76 in the movable carriage 54. The disk 62 is also provided with a circumferential ring gear 78 that is driven by a pinion 79 and a motor 80. Accurate positioning of the disk 62 relative to the carriage 54 is provided by the conventional pneumatically actuated shot pin 82 and conical aperture 84. When the shot pin 82 is retracted, the motor 80 can be driven to rotate the disk 62 and upper arms 60 in 90° increments about the shaft 64. By holding the motor 72 de-energized, the gear 70 will be locked, thus simultaneously causing the belts 68 to rotate, thus rotating the plates 66 of each of the chucks 26. It is a unique feature of this invention that the gear ratio between the gearing 70 and the pinion and ring gear 79 and 78, respectively, is such that upon 90° rotation of the turret 24, the chucks 26 will have been rotated in the opposite direction to maintain the same orientation of the parts in the chucks in each of the stations.

The upper arms 60 each carry an upper portion of the chuck 26, which likewise is rotatable. Although various arrangements will be satisfactory, the preferred form provides a movable plate 86 rotatably mounted in a retainer block 88. A removable retainer clip 90 holds the movable member 86 in the retainer block 88. The retainer block 88 is movable vertically a sufficient distance to allow placement of a part between the two movable plates 86 and 66. To clamp the part between the plates, a piston rod 92 is threadably secured to the retainer block 88 and is slidably positioned in the upper arm 60. The piston of the piston rod 92 is slidably held in a cylinder 94 and is spring biased upwardly by a spring 96. Air introduced through a line 97 will move the piston rod downwardly, thus clamping a part P between the movable plates 86 and 66. De-energization of the air pressure will allow the spring 96 to raise the movable plate 86, thus releasing the part. Air is brought in separately to each of the rotary chucks 26 since at some stations the part will remain clamped between the movable plates 86 and 66; while at the receiving and discharging stations of the rotary turret 24, the part may be inserted and released.

It is thus readily apparent that the contouring apparatus 22 provides a means for linearly translating a part while simultaneously rotating the part. Obviously, such a mechanism has utility in various types of sheet metal or other sheet material fabricating machines. It is especially useful in a periphery cutting operation which will now be described.

BLADE ANGLE ATTITUDE

Figure 4:
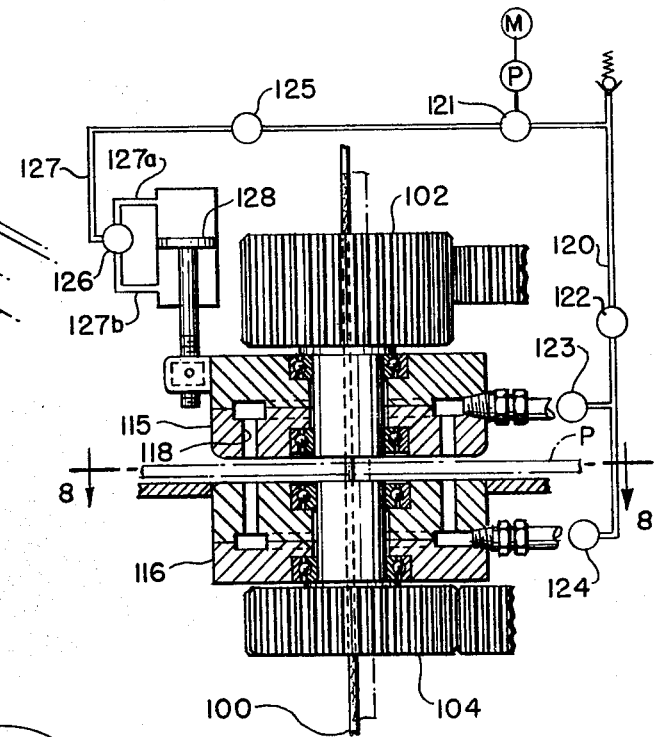
FIG. 4 is a vertical section taken along the arrows 4—4 of FIG. 3.
Figure 5:
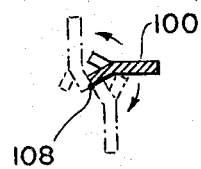
FIG. 5 is a schematic horizontal section taken through the blade of the cutting tool shown in FIG. 9.
Figure 6:
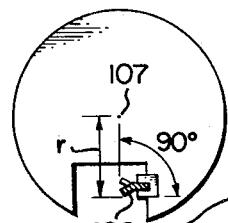
FIG. 6 is a schematic horizontal section taken through the blade shown in FIG. 3.
Figure 8:
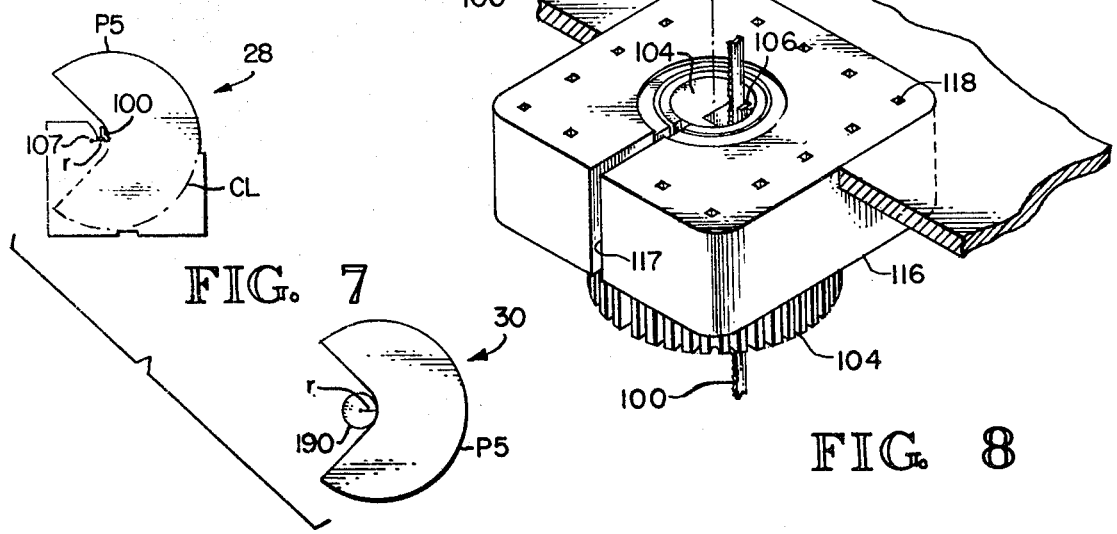
FIG. 8 is a fragmentary isometric of a portion of the blade guiding and air cushion supporting apparatus shown in FIG. 4.

The basic principles of the cutting apparatus are described in my earlier filed patent application, Ser. No. 359,983, now abandoned, of which this application is a continuation-in-part. Similarly, details of that description are incorporated herein by reference to the application. In the now preferred form of the cutting apparatus, a rotary band saw blade 100 is held in an upper guide 102 and a lower guide 104 (FIG. 4). As best shown in FIG. 8, the guides each have a hard carbide guide insert 106 which is offset rearwardly of the center of rotation 107 of the guides 102 and 104 and is spaced along the diameter a distance $r$ from the axis of rotation such that the cutting edge of the blade moves about the axis of rotation at the same distance as the cutting surface of the deburring tool 190 moves about its axis of rotation (FIG. 6). Two sets of timing belt drive gears 110 are driven by a servo motor 112 to simultaneously rotate the upper and lower guides 102 and 104. Rotation may be obtained in this manner from a central blade position, shown in FIG. 5 in solid lines, to either of two 90° positions on either side of the central blade position. If desired, further rotation may be provided, being limited only by the structural capability of the blade 100. As an alternative, of course, the entire band saw maching 28 can be rotated about the axis 107.

Figure 7:
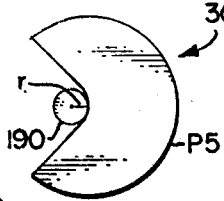
FIG. 7 is a schematic operational view illustrating an offset cutting blade pivot arrangement used with a cylindrical deburring tool.

The purpose of the offset position of the cutting blade being correlated to the radius of the deburring tool 190 is best explained with reference to FIG. 7, in which two parts are shown as they would be simultaneously moved at the cutting and deburring stations 28 and 30. As is readily apparent, the cylindrical deburring tool 190 has a deburring surface which is spaced a distance $r$ from the axis of rotation of the tool 190. Thus, if the part P-5 has a radius to be cut equal to the radium $r$ of the deburring tool, the part P-5 must be halted. The cutting blade 100, however, must still traverse the radius of the part. This is accomplished while the part is held stationary by merely rotating the blade by numerical control about the axis 107. Since the distance $r$ is the same for the balde and the deburring tool, rotation of the blade will follow the desired radius of the part. When the radius has been cut, simultaneous movement of the part at the deburring and cutting stations will continue.

As an alternative, the deburring tool can be a second fine-toothed band saw blade having a point contact with the part identical to that of the cutting blade 100. In such case, the axis of rotation of both blades can be exactly at the cutting edge of each blade in a manner illustrated in more detail with reference to FIGS. 5, 9–12.

AIR CUSHION EDGE SUPPORT

With the above background described, the important feature of this application will now be described. It is desirable when working with most thicknesses of sheet material to support the part immediately in the vicinity of the cutting blade. It is also desirable to allow, however, free planar movement of the part to incorporate the peripheral contouring principles of this invention. For this purpose, a fixed upper air cushion pad 115 (FIG. 4) and an identical fixed lower pad 116 are provided, respectively, on the guides 102 and 104. The guides 102 and 104 are rotatably mounted within the pads. The guides, gears and pads are provided with an aligned slot 117 to allow removal of the blade. Each of the pads is provided with air cushioning ports 118 in a well-known manner which are distributed throughout the surfaces of the pads exposed to the part P. An air line 120 distributes air from a pump, motor and tank 121 to the ports 118. Adjustable pressure restriction valves 123 and 124 regulate the air pressure to the pads. A shut-off valve 122 controls the flow of air to the pads. Similarly, a shut-off valve 125 and a pressure restricting and directional valve 126 are provided in a line 127. Line 127 connects to either a line 127a or 127b which go to a cylinder on either side of a piston 128. A piston rod connected to piston 128 connects to pad 115 to raise and lower the pad.

As can be readily seen, air pressure on the piston 128 will urge the upper pad 115 down against the part P. Air pressure in the ports of pad 116 will tend to raise the part P on a cushion of air. Air pressure in the ports of pad 115 will provide an air cushion on the top of the part to dampen vibrations caused during cutting. The air cushion allows free movement of the part in a planar direction while supporting it against movement in a vertical direction. Obviously, to accomplish this, a balance is required between the air pressures at the piston 128 and the ports in pads 115 and 116. This balance will depend to a large extent on the weight of the part unsupported by the chuck 26, the cutting force and the size and number of ports. Assuming an unsupported weight of 15 lbs. for a part P-1, and using generally available shop air pressure of 100 psi, a restriction valve 125 for reducing the pressure to 40 psi and a piston size of 1 square inch can be used. Thus the downward force on P-1 is 15 lbs. plus 40 lbs. or 55 lbs. Valve 124 is then adjusted to provide an air pressure greater than 55 lbs. plus the force derived by the cutting blade passing through the material. It is estimated that a pressure of 75 psi or greater (greater air pressure in the lower pad will merely lift the part higher, thus increasing the space between the part and the ports to reduce the lifting force on the part) is sufficient in the pad 16 for the example given to hold the part off the surface of the pad 116. The air pressure in pad 115 can be shop pressure of 100 psi since its cushioning force is automatically limited by the 40 lbs. applied by piston 128. That is, the height of the pad above the part P will vary depending on the balance between the pressure on piston 128 and the pressure exerted by air from pad 116. As is well known, the air cushion force is also controlled by the position of the pad from the part and thus a balance will continually be sought while fully supporting the part.

COMBINED CUTTING AND PART MOVEMENT

The servo motor 112 for changing the angular attitude of the blade 100, the servo motor 72 for changing the angular orientation of the part, and the servo motor 58 for changing the linear position of the part are all simultaneously operated, preferably by computerized control, such that the part will be cut along a peripheral shape. The ability to change the angular attitude of the blade 100 and provide rotation of the part greatly reduces the amount of linear translation necessary to cut a peripheral contour on the part, especially for full sheets W several feet in length and width, for example, or more commonly, smaller parts P of several inches in size, length and width. As is best shown in FIG. 11, the part is provided with notches 135 made during the punching operation to allow the waste material to fall free of the part at spaced intervals around the periphery of the part. Additional notches may be provided for relief at sharp corners on the peripheral shape to assure that the blade 100 has ample freedom for its rear surface to negotiate the sharp turns. In general, the blade 100 will have little interference since the conventional band saw blade has its teeth set apart, which allows freedom for the rear of the blade to move without interfering with the part. The notches, of course, eliminate any interference for radically sharp turns. As is readily apparent, movement of the cutting blade into or between the phantom line positions shown in FIG. 5 results in a change in the cutting angle relative to the cutting line CL on the periphery of the part without substantial change necessary in the position of the part. Thus, where the blade 100 follows a cutting line CL on a part P (FIGS. 7 and 11) and approaches a point 1 (FIG. 11), it is readily apparent that as point 1 on the cutting line approaches the cutting blade 100, it will be unnecessary to rotate the part substantially 90°, as in previous practice, in order to change the direction of the cutting line, but rather, the part can be moved a short distance simultaneously with pivoting of the cutting blade to make the change in cutting direction.

It should be understood that the unique rotary band saw concept of cutting a peripheral shape on a part or worksheet advantageously employs state-of-the-art cutting apparatus. The contouring apparatus, however, can also advantageously be used with rotary routers, slitter, lasers and other well-known sheet material cutting tools, some of which may not require the blade orientation feature of the preferred embodiment herein described.

FIGS. 9-12 similarly describe a modified contouring apparatus but contain the same basic principles as in the preferred embodiment. In this modified form, the cutting blade 100 is held in more simplified rotary guides 140 and 142. The attitude of the guides is controlled by timing-belt driven gears 144 powered by a worm 146 and servo motor 148. A part P, as in the preferred embodiment, is held in a contouring apparatus 150 having a single upper arm 152. The upper arm 152 is provided with a rotary sleeve 154 that houses a piston 156. The lower end of the piston is connected to a clamp plate 158 centering pins 160. In this embodiment, the part P will be provided with centering or pilot holes 162 that will be punched at the punch press 10. In the lower part of the contouring apparatus 150, the arm 152 is rigidly secured to a movable carriage 164. The carriage slides in guides 166 and is powered by a rack and pinion mechanism 168 by a servo motor 170.

The movable carriage 164 is also provided with a rotatably mounted plate 172 which has corresponding openings 174 for receiving the pins 160. The lower plate 172 is rotated by a gear 176 and servo motor 178. Controls 179 and 180 simultaneously control the servo motors 170, 178 and 148 for providing the simultaneous linear and rotational movement of the part P with the angular attitude change of the blade 100.

In this embodiment, tough carbide inserts 182 are offset only slightly from the central axis of rotation 108 of the guides to allow the inside cutting edge of the blade to pivot about the axis 108. Also as in the preferred embodiment, slots 184 are provided in the upper and lower guides similar to the slots 117 to allow removal and replacement of the blade.

While the preferred embodiments of the low-friction worksheet peripheral region support have been illustrated and described, along with illustrative forms of cutter tools and sheet moving apparatus, it should be understood that variations will be apparent to one skilled in the art without departing from the principles described herein. Accordingly, the invention is not limited to the specific form illustrated.

The embodiments of the invention in which a particular property or privilege is claimed are defined as follows:

1. A worksheet supporting mechanism for use in supporting a portion of the worksheet in close proximity to a cutting tool, comprising lower air cushion means spaced closely below the worksheet for providing an upwardly directed cushion of air for lifting the worksheet, and upper air cushion means spaced closely above the worksheet for providing a downwardly directed cushion of air for urging the worksheet downwardly toward the lower air cushion means whereby said air cushions support a portion of the worksheet for free planar movement and dampen vibrations caused during cutting, including self-compensating means for allowing movement of one said air cushion means away from the other air cushion means for receiving varying thicknesses of worksheets therebetween while maintaining approximately the same air cushion pressure on the side of the worksheet exposed to the movable air cushion means.

2. A worksheet supporting mechanism for use in supporting a portion of the work sheet in close proximity to a cutting tool, comprising lower air cushion means spaced closely below the worksheet for providing an upwardly directed cushion of air for lifting the worksheet, and upper air cushion means spaced closely above the worksheet for providing a downwardly directed cushion of air for urging the work sheet downwardly toward the lower air cushion means whereby said air cushions support a portion of the worksheet for free planar movement and dampen vibrations caused during cutting, including means for moving one said air cushion means away from the other air cushion means for receiving a worksheet therebetween said moving means including a piston, an air source coupled to said piston and air control means for balancing the air on said piston with the air in said air cushion means to automatically adjust the air cushioning pressures provided by the upper and lower air cushioning means.

3. The apparatus of claim 2, said cutting tool including a band saw blade, said means for moving said one air cushion means including a piston rod secured to said upper air cushion means and to said piston, said piston being fitted within a cylinder and being sized to provide a downward force on said upper air cushion means, the air pressure in said lower air cushion means being sufficient to slightly overcome the combined sum of weight of the unsupported portion of the worksheet, plus the downward cutting force of the band saw blade, plus the downward force of said piston rod.

4. Supporting apparatus for the peripheral region of the upper and lower surfaces of a pliable, generally self-form-sustaining worksheet while being moved in the plane of the worksheet in close proximity to a cutting tool of the type which imposes vibratory forces on the worksheet peripheral region when cutting, comprising upper means for providing a low-friction, generally uniform downwardly directed air cushion force on the upper surface surrounding the cutting tool, lower means for providing a low-friction, generally uniform upwardly directed air cushion force on the lower surface surrounding the cutting tool, and means for controlling the uniform forces for dampening the vibrations while allowing free movement of the worksheet relative to the cutting tool, said controlling means including biasing means connected to said upper means for moving the upper means toward the worksheet with a predetermined force but which allows movement of the upper means toward and away from said worksheet to compensate for worksheets of varying thickness and/or weight.

5. The supporting apparatus of claim 4, said cutting tool including an endless band saw blade which imposes a continuous downward force on the worksheet when cutting, said lower means providing an upward force in excess of the downward force provided by said cutting blade of an amount approximately equal to the weight of the supported worksheet peripheral region, plus the blade imposed downward force and the force of said biasing means.

6. The apparatus of claim 1, said self-compensating means including means for initially positively moving one of said air cushion means away from the other air cushion means to position a workpiece between the air cushion means.

* * * * *